United States Patent
Stowasser

(10) Patent No.: US 8,606,033 B2
(45) Date of Patent: Dec. 10, 2013

(54) METHOD FOR PROVIDING IMAGE DATA

(75) Inventor: Boris Stowasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 228 days.

(21) Appl. No.: 13/039,890

(22) Filed: Mar. 3, 2011

(65) Prior Publication Data

US 2011/0216986 A1    Sep. 8, 2011

(30) Foreign Application Priority Data

Mar. 5, 2010    (DE) .......................... 10 2010 011 447

(51) Int. Cl.
*G06K 9/40*    (2006.01)

(52) U.S. Cl.
USPC .................. 382/260; 378/17; 378/19; 378/4; 382/131

(58) Field of Classification Search
None
See application file for complete search history.

(56) References Cited

U.S. PATENT DOCUMENTS

| | | | | |
|---|---|---|---|---|
| 5,115,394 A * | 5/1992 | Walters | ........................ | 382/131 |
| 6,507,633 B1 * | 1/2003 | Elbakri et al. | ..................... | 378/8 |
| 6,529,575 B1 * | 3/2003 | Hsieh | ................................. | 378/4 |
| 6,996,206 B2 * | 2/2006 | Hsieh et al. | ...................... | 378/19 |
| 7,376,255 B2 * | 5/2008 | De Man et al. | ................ | 382/131 |
| 7,382,853 B2 * | 6/2008 | Arenson et al. | .................. | 378/19 |
| 7,548,604 B2 * | 6/2009 | De Man et al. | ................. | 378/17 |
| 2004/0101103 A1 * | 5/2004 | Warp et al. | ................. | 378/98.12 |
| 2005/0226484 A1 * | 10/2005 | Basu et al. | ..................... | 382/131 |
| 2009/0161820 A1 * | 6/2009 | Raupach | ......................... | 378/19 |
| 2010/0111247 A1 | 5/2010 | Heismann et al. | ................ | 378/8 |
| 2010/0272340 A1 * | 10/2010 | Bar-Aviv et al. | ............. | 382/131 |
| 2011/0044524 A1 * | 2/2011 | Wang et al. | ................... | 382/131 |

FOREIGN PATENT DOCUMENTS

| | | | | |
|---|---|---|---|---|
| DE | 10201321 A1 | 7/2003 | | |
| DE | 10327042 A1 | 1/2005 | ............... | A61B 6/00 |

\* cited by examiner

*Primary Examiner* — Tsung-Yin Tsai
(74) *Attorney, Agent, or Firm* — King & Spalding L.L.P.

(57) ABSTRACT

X-ray beam detectors in one model can individually differ from one another. This can lead to differences in the amount of noise in an image recorded with the aid of the respective X-ray beam detector. In the present case, a variable is derived using an empty image, which variable reproduces the amount of noise, and this variable then determines the type and extent of a filtering process. Hence the image processing is adapted to the respective individual noise behavior of the respective X-ray beam detector. This is particularly suitable if the X-ray beam detector is a flat-panel detector (100) with a scintillator (22) and photodetector elements (12).

13 Claims, 5 Drawing Sheets

METHOD FOR PROVIDING IMAGE DATA

CROSS-REFERENCE TO RELATED APPLICATIONS

This application claims priority to DE Patent Application No. 10 2010 011 447.7 filed Mar. 5, 2010. The contents of which is incorporated herein by reference in its entirety.

TECHNICAL FIELD

The invention relates to a method for providing image data, particularly in a two-dimensional image data record, that is to say a set of grayscale values that are associated with image recording elements in a two-dimensional array. The image data is provided with the aid of an X-ray image recording device, which has an X-ray beam source and an X-ray beam detector. Said X-ray image recording device moreover has means for processing detector data provided by the X-ray beam detector, that is to say the image data in an unprocessed raw form.

BACKGROUND

The image processing on the basis of the detector data conventionally also comprises the application of filters in addition to normalization. There are spatial filters, in which specific pixels are assigned values that are dependent on the values of the adjacent pixels, and likewise there is a temporal filtering process, in which the numerical values assigned to the individual pixels for a specific time are dependent on such values of the same pixel at times that are close to the specific time. Hence, in the spatial filtering process, there is a spatial neighborhood for each pixel, which neighborhood is taken into account during the filtering process, and there is a temporal neighborhood for any given time in the temporal filtering process.

An object of the filtering process is to suppress noise effects and to highlight the actual image signals more clearly. Image signals are identified by the relatively high local contrast. A standard deviation of the grayscale values can be calculated within a certain neighborhood of individual points. If the standard deviation is particularly large, this is the result of structures that are imaged in the X-ray image. In the case of small standard deviations, the assumption may be made that the effects are a result of noise. There is only little local averaging in the case of large standard deviations in order not to smudge the structures. In the case of small standard deviations, the numerical values are averaged in neighborhoods in order to reduce the noise effects. The process now is very sensitive to where the boundary is set between small and large standard deviations and hence where the boundary is set between strong and weak averaging.

It has been conventional for the filter functions in X-ray image recording devices to be fixedly prescribed for a particular model. Individual properties of the respective X-ray beam detectors are not taken into account. The functions can each be associated with individual modes of the X-ray image recording device, wherein the different modes for example can differ in the X-ray beam dose emitted by the X-ray beam source.

The noise behavior of X-ray beam detectors depends sensitively on individual parameters, for example on the thickness of a scintillator layer in the case of a flat-panel detector with precisely this layer. Depending on the quality of the manufacturing, there may moreover be variations in the electrical properties of the components; for example, if the utilized material varies in purity there is a different amount of noise. The internal gain factors provided by the components can also vary. However, these factors have a direct effect on the noise.

SUMMARY

According to various embodiments, a method and system for providing (2D-) image data (records) can be provided, which provides noise-free images in an improved fashion, in which the actual image signals are highlighted more clearly.

According to an embodiment, a method for providing two-dimensional image data with the aid of an X-ray image recording device, which has an X-ray beam source and an X-ray beam detector and also means for processing detector data provided by the X-ray beam detector, may comprise the steps of: a) operating the X-ray image recording device without an image object in the X-ray image recording device in order to obtain detector data corresponding to an empty image, b) evaluating the detector data obtained in step a) for obtaining the value of a statistical variable that contains information relating to the amount of noise, c) setting the value of at least one variable for a filtering process, which at least one variable determines the type and/or the extent of a spatial and/or temporal filtering process as a function of the value of the statistical variable, d) operating the X-ray image recording device with an image object in the X-ray image recording device in order to obtain detector data corresponding to an X-ray image of the image object, and e) processing the detector data using a spatial and/or temporal filtering process determined by the at least one variable set in step c) in order to provide the two-dimensional image data.

According to a further embodiment, the statistical variable can be a standard deviation or a variance. According to a further embodiment, the statistical variable may determine the curve profile of a curve that reproduces the extent of averaging within the scope of the filtering process as a function of a local standard deviation or a standard deviation relating to a short period of time. According to a further embodiment, step a) can be carried out repeatedly using different X-ray beam doses and a value for the statistical variable can be derived in step b) for each X-ray beam dose and a value for a variable for the filtering process can be set in step c), and in which the filtering process in step e) can be carried out on the basis of a value that is associated with an X-ray beam dose utilized in step d). According to a further embodiment, the statistical variable can be established in step b) for a plurality of spatial frequencies, the at least one variable for the filtering process is set in step c) for each spatial frequency and the filtering process in step e) is carried out separately for each of the plurality of spatial frequencies. According to a further embodiment, the method as described above can be implemented using an X-ray image recording device, in which the X-ray beam detector is a flat-panel detector with a scintillator and a plurality of photodetector elements.

BRIEF DESCRIPTION OF THE DRAWINGS

In the following text, the various embodiments will be described in more detail with reference to the drawings, in which.

DETAILED DESCRIPTION

Figure 1:
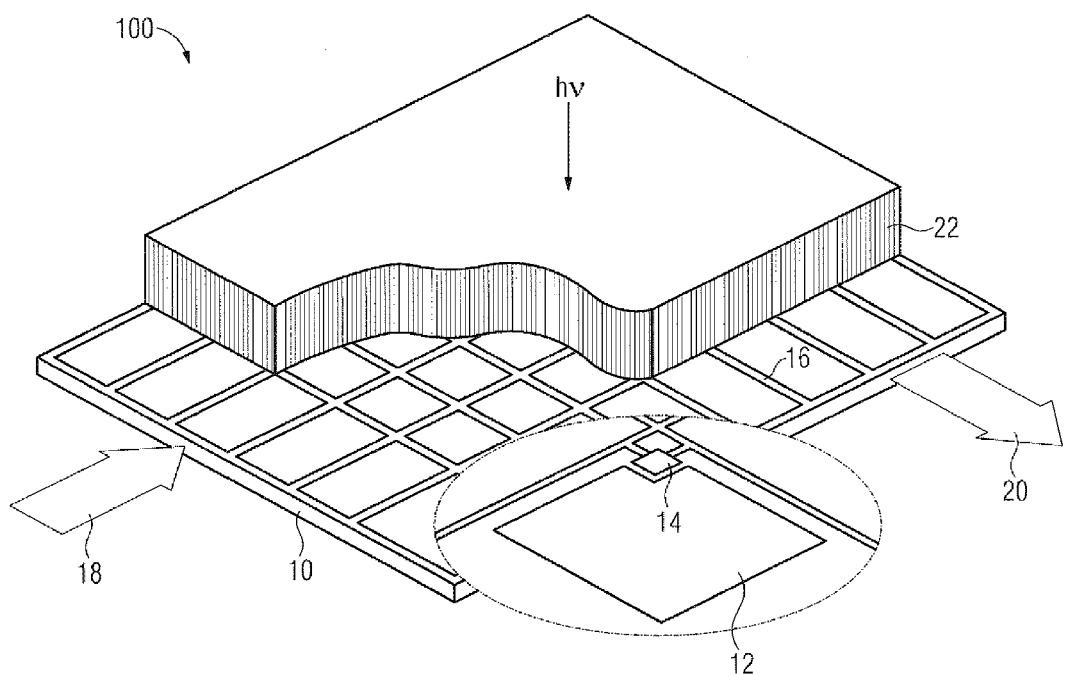
FIG. 1 shows a flat-panel detector in a perspective, partly opened-up view with partial magnification, where various embodiments can be utilized if said flat-panel detector is used, FIG. 2 schematically shows the generation of noise in an X-ray image on the basis of a signal path.

The method according to various embodiments starts by operating the X-ray image recording device without an image object in the X-ray image recording device in order to obtain detector data corresponding to an empty image. In other words, the X-ray image recording device, typically after receiving an appropriate input, carries out image-recording steps for obtaining at least one X-ray image, even if no image object is provided. Subsequently, in step b), the detector data obtained in the first step a) is evaluated for obtaining the value of a statistical variable that contains information relating to the amount of noise. Thereupon, as per step c), the value of at least one variable for the filtering process is set, which at least one variable determines the type and/or the extent of a spatial and/or temporal filtering process, to be precise as a function of the value of the statistical variable obtained in step b). Steps a) to c) of the method according to various embodiments thus define (at least one aspect of) the filter function, which is conventionally fixedly prescribed. The method then continues by virtue of the fact that, as per step d), the X-ray image recording device is operated with an image object in the X-ray image recording device in order to obtain detector data corresponding to an X-ray image of the image object and/or provides and/or displays such an X-ray image. The detector data is processed using a spatial and/or temporal filtering process determined by the at least one variable set in step c) in order to provide the 2D image data. In other words, the filter function set as per steps a) to c) is then utilized in a conventional fashion per se.

Hence, a filtering process that is individually adapted to the X-ray beam detector is undertaken by the method according to various embodiments. In a manner of speaking, the noise as such is measured by using an empty image. The filtering process is then carried out as a result of the measurement. Should the X-ray beam detector somehow deviate from an average, in a manner of speaking normal, X-ray beam detector, the present method nevertheless ensures that the actual image signals are highlighted particularly well after the filtering process and there is good noise suppression.

In an embodiment, the statistical variable is a standard deviation (or else a variance, which is the square of the standard deviation). Such a standard deviation is established on the basis of the numerical values in the detector data that provides a 2D image data record in an unprocessed form. The standard deviation is a particularly good measure for the noise; this is also the case because it is proportional to an intrinsic gain of the elements of the X-ray beam detector.

In an embodiment, the statistical variable determines the profile of a curve that reproduces the extent of averaging (with respect to space or time) within the scope of the filtering process, to be precise as a function of a standard deviation defined locally in each case (in the case of a spatial filtering process) or a standard deviation relating to a short period of time, i.e. relating to a succession of recorded images. In particular, the statistical variable can reproduce the location of a jump in such a curve, which jump corresponds to a threshold that separates noise from image signals. As a result of determining the curve profile on the basis of the statistical variable, there is a direct connection between the averaging undertaken in the filtering process and the amount of noise. In the case of a suitably selected dependence of functional parameters of the curve with respect to the statistical variable, it is precisely the noise that is averaged away, and the image signals remain in the image with a high contrast.

The method according to various embodiments can be refined by virtue of the fact that the dependence on the utilized X-ray dose is taken into account. Accordingly, step a) is carried out repeatedly using different X-ray beam doses, a value for the statistical variable is derived in step b) for each different X-ray beam dose and then a value for the variable for the filtering process is also set in step c). The filtering process in step e), that is to say for an actually recorded X-ray image, is naturally carried out on the basis of the value of the X-ray beam dose that was valid when this X-ray image was recorded in step d). It is well known that more noise effects are recorded at low X-ray beam doses than at higher X-ray beam doses. This is duly accounted for various embodiments of the method.

The noise effects may also be collective effects of the components of the X-ray beam detector. Overall, the causes of noise are not such that the noise is distributed with the same energy component over all frequencies. Therefore, this is not white noise. It is for this reason that, in one embodiment, the standard deviation is established in step b) for a plurality of spatial frequencies, the at least one variable for the filtering process is set in step c) for each of these spatial frequencies and the filtering process in step e) is then carried out separately for each of the plurality of spatial frequencies. Spatial-frequency-dependent filtering as such is known per se.

The method according to various embodiments may be preferably used if the X-ray beam detector is a flat-panel detector with a scintillator and a plurality of photodetector elements. The scintillator converts incident X-ray beams into light, which is registered by the photodetector elements. It was found to be advantageous, particularly in the case of such flat-panel detectors, if individual properties are accounted for in an improved fashion; there are large manufacturing tolerances in the manufacturing of flat-panel detectors, for example relating to the thickness of the scintillator layer or else the thickness of the photosensitive layer of the photodetector elements and the purity thereof.

A flat-panel detector, denoted in its entirety by 100, has a substrate 10 on which individual photodetector elements 12 (in the form of photodiodes) are formed. Switches 14 couple said photodetector elements to conductor tracks 16. There is a so-called row driver 18 at the edge of the substrate 10, the former querying all photodetector elements 12 in a row; output signals as per the arrow 20 for a column-by-column readout then emerge column-by-column. There is a scintillator layer 22 on the photodetector elements 12. X-ray beam quanta hv, which are incident on the scintillator layer, are converted into photons by the latter, which photons are registered by the photodetector elements 12.

The X-ray quanta hv are incident with a Poisson distribution ("$Poi(\lambda)$") per unit area and per unit time. According to the signal path, they firstly reach the scintillator 22 and then the photodetector elements 12. Gaussian noise ("$\sigma$") and a gain factor G1 are added here and due to so-called binning, a possible combination of a plurality of detector elements 12, or else due to explicit amplification. The detector data, that is to say the data read out of the X-ray beam detector 12 as per the arrow 20, thus contains not only noise resulting from the Poisson distribution of the X-ray beam quanta hv, but the Gaussian noise is combined with this noise and the noise is amplified linearly by the gain factor G1 "$(G1 \cdot (Poi(\lambda) \oplus Gauss(\sigma))$".

This is followed by image processing. The detector data is firstly normalized and additionally multiplied by a factor G2. This factor can be both greater than and less than one. Hence the noise up until now is amplified by the factor G2. This is followed by a spatial filtering process and a temporal filtering process within the scope of the image processing. The noise is intended to be reduced by this image processing.

Within the scope of the various embodiments there is a measurement of at least the noise before the normalization, that is to say on the basis of the detector data. Here, "measurement of the noise" should be understood to mean that a variable is derived from measured values, which variable provides information relating to the amount of noise. In particular, the frequency-dependent standard deviation is established.

Figure 3:
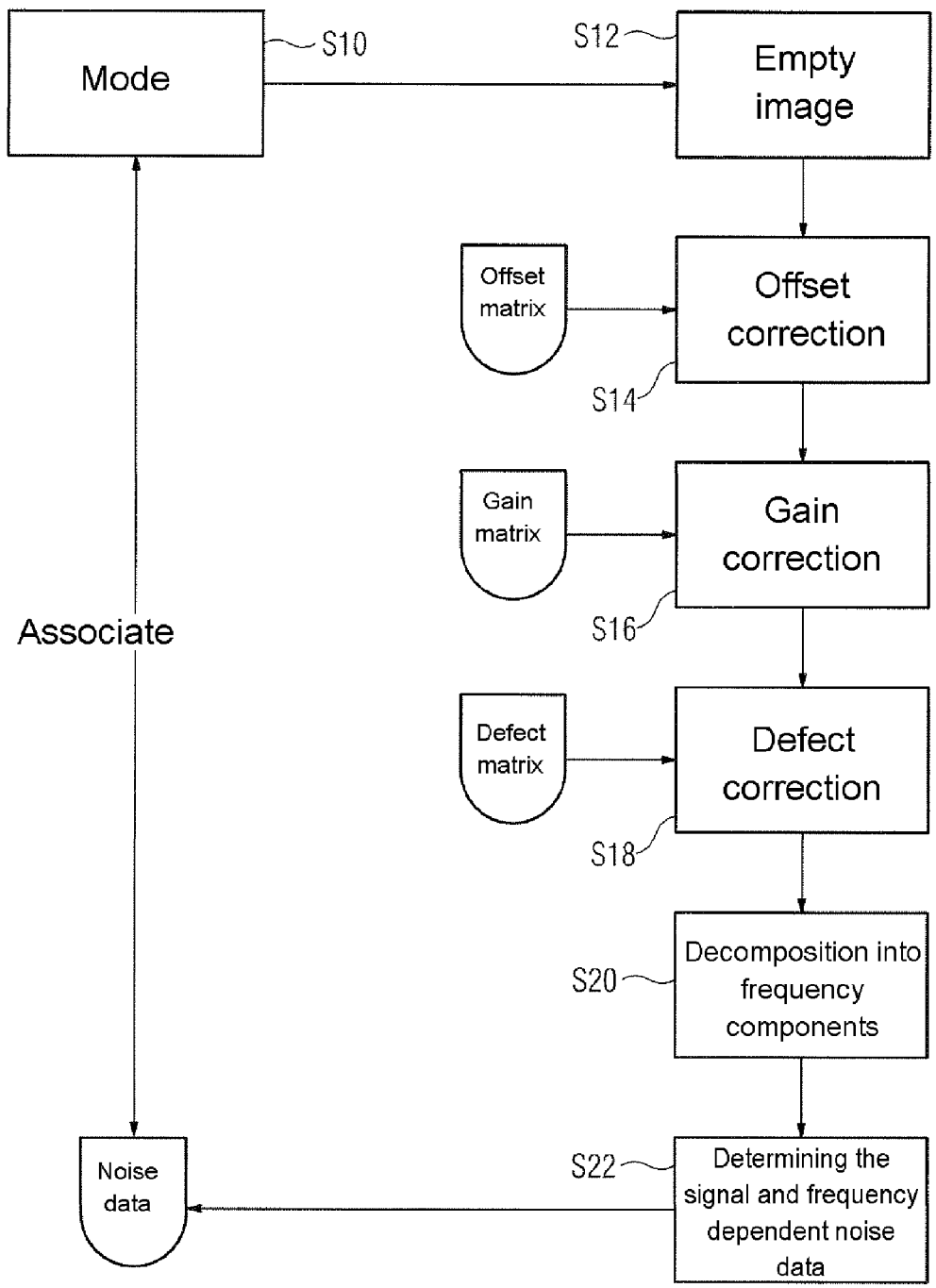
FIG. 3 shows a flowchart of how information in respect of the noise can be derived by measurements.

As per FIG. 3, a mode for which information in respect of the noise should be obtained is first of all set in a step S10. An empty image is recorded in this mode as per step S12.

Before this takes place, the so-called offset matrix was measured, which is the extent of those signals generated in each photodetector element 12 even in the absence of X-ray beam quanta; this is traced back to the so-called dark current. Accordingly, the offset matrix is established by obtaining detector data—by recording an image in a manner of speaking—without there being an X-ray beam irradiation. The offset matrix allows an offset correction as per step S14 to be undertaken on the empty image.

The gain of each individual photodetector element 12 can likewise be established in a manner known per se, so that a so-called gain matrix can be derived, and the individual pixels of the processed empty image resulting from step S14 can be subjected to a gain correction as per step S16.

Finally, individual photodetector elements may be defective. In this case, the signals emitted thereby are discarded and an interpolation is undertaken. A defect matrix, which specifies which detector elements are defective, thus allows a defect correction as per step S18.

After the processing in steps S14, S16 and S18, the empty image is subjected to a spatial-frequency transformation, i.e. the numerical values are decomposed into frequency components (step S20). A standard deviation σ(f) depending on the signal (see mode S10) and frequency can thereupon be established in each case for individual frequencies or frequency bands in step S22. The derivation of such standard deviations from images is known per se. The grayscale values are basically subjected to statistical analysis, to be precise the grayscale values for partial images that hold true for the respective spatial frequencies.

Thus, noise data is finally obtained, which is then assigned to the mode.

Figure 2:
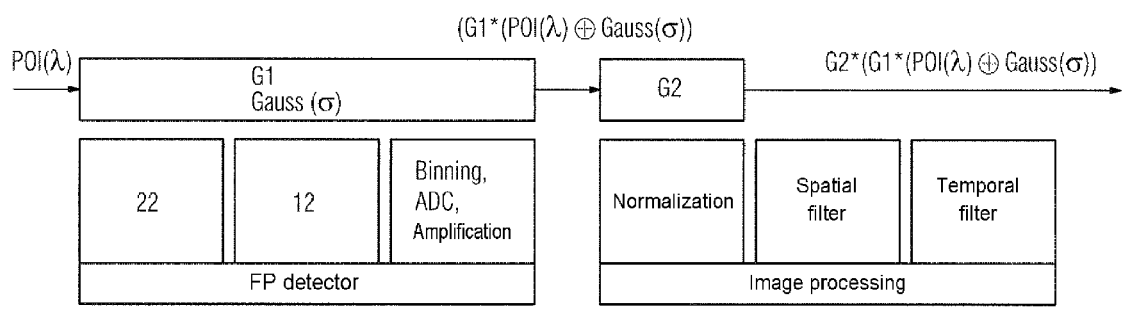

This noise data can now be used as follows: a spatial filtering process, as takes place as per FIG. 2 after the normalization, involves assigning a new value to an image data point, which new value emerges from the previous value and values of points in a certain region or neighborhood, for example according to the formula $$ap(x_0, y_0) + \frac{(1-a)}{N}\sum^{N} p(x_0 \pm \Delta, y_0 \pm \Delta),$$

where $a \in [0,1]$ and $p(x,y)$ is a grayscale value for the respective image data point and $p(x_0 \pm \Delta, y_0 \pm \Delta)$ is a grayscale value for a neighboring point thereof.

Figure 4:
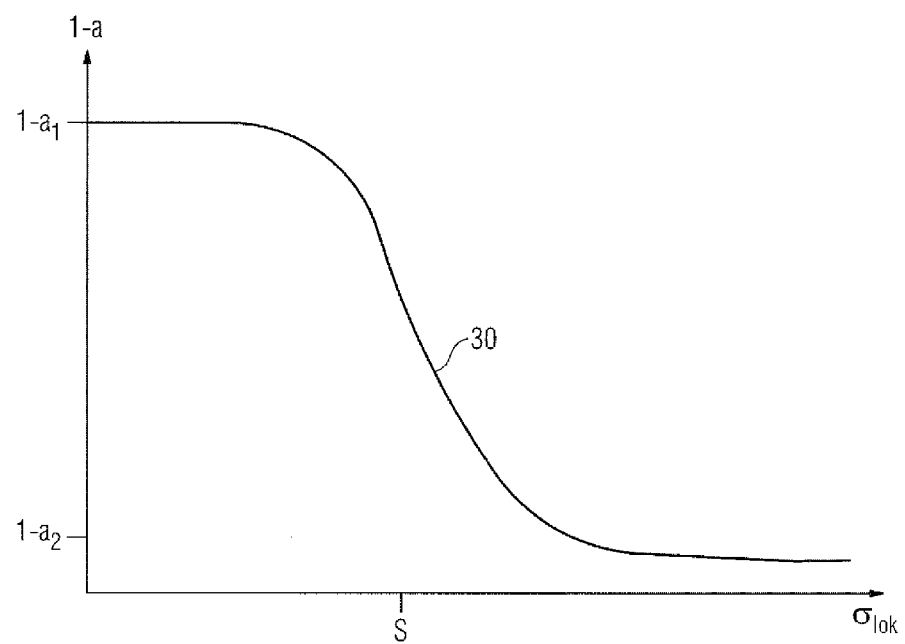
FIG. 4 shows a graph that defines a spatial or temporal filtering process.

FIG. 4 shows a function 1-a. The value of this function is particularly high if the component of the numerical value of the pixel itself is small and the components of the neighboring values are large, i.e. if the averaging is strong, and the value 1-a is very small if the values of the adjacent pixels hardly feature in the new value.

The averaging 1-a is assigned within the scope of the filtering process, to be precise as a function of a respectively local standard deviation $\sigma_{loc}$. The local standard deviation is a type of infinitesimal standard deviation, which is established in a small area around a respective pixel and assigned thereto. FIG. 4 shows a graph 30 that is equivalent to a rounded step function: the value of 1-a is relatively high up to a threshold S $(1-a_1)$ and then falls to a lower value $(1-a_2)$ in a region around the threshold S. The information contained in the graph 30 therefore shows that there is relatively strong averaging in the case of low standard deviations $\sigma_{loc}$. Low standard deviations are an argument for noise effects, and averaging is suggested in this case. In the case of large values of the standard deviations $\sigma_{loc}$, there is little averaging around the relevant pixel. The assumption may be made in the case of large standard deviations that actual image signals are the reason for the statistical deviation. Averaging is not suggested in this case.

According to various embodiments, the position of the threshold S is now determined using the noise data, more particularly the values of σ(f), obtained as a result of the empty image; that is to say S(f)=S(σ(f)). There is a filter curve in the style of the graph 30 for each frequency. Hence, where the noise ends and where the signals begin is set for each frequency. This ensures that the individual noise of the flat-panel detector 100 is filtered out in a fashion that is individually adjusted to the respective flat-panel detector.

The explanations in respect of the graph 30 for a spatial filtering process apply, mutatis mutandis, for a temporal filtering process. In a temporal filtering process, the filtering takes place over a plurality of successively recorded images.

Figure 5:
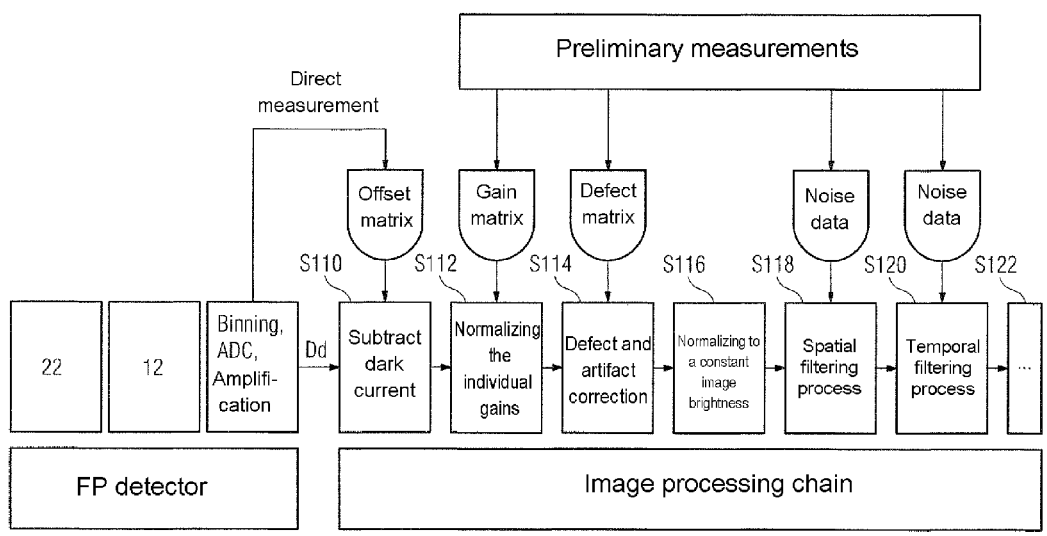
FIG. 5 shows a flowchart that schematically illustrates the method according to various embodiments as a whole.

The entire method is once again illustrated on the basis of FIG. 5: preliminary measurements mean that the gain matrix is known, the defect matrix is known and the noise data σ(f) has been established for a respective mode. In this mode, the X-ray beam quanta by reach the scintillator 22 and, then, the photodetector elements 12, then there are effects as a result of binning, ADC and amplification, and the detector data Dd is provided. At the same time, an offset matrix is established by direct measurement. The dark current is first of all subtracted from the detector data Dd as per step S110, which detector data is present in the form of a two-dimensional X-ray image; then the individual gains are normalized in step S112 on the basis of the gain matrix; and there is a defect and artifact correction on the basis of the defect matrix in step S114. This is then followed in the image-processing chain by normalization to a constant image brightness as per step S116, and the noise data σ(f) established in advance is used in a subsequent spatial filtering process as per step S118, just like the corresponding noise data is used in a subsequent temporal filtering process as per step S120. The image-processing chain can then also comprise further steps S122.

Thus, the method according to various embodiments provides two-dimensional image data records (X-ray images with grayscale values for pixels in a two-dimensional arrangement) that were subjected to such a filtering process that as much noise as possible has been removed. Since the noise was quantified on the basis of measurements, the individual peculiarities of the flat-panel detector (100) have been provided for.

What is claimed is:

1. A method for providing two-dimensional image data with the aid of an X-ray image recording device, which has an X-ray beam source and an X-ray beam detector and also means for processing detector data provided by the X-ray beam detector, comprising the steps of:
  a) operating the X-ray image recording device without an image object in the X-ray image recording device in order to obtain detector data corresponding to an empty image,
  b) evaluating the detector data obtained in step a) for obtaining the value of a statistical variable that contains information relating to the amount of noise,
  c) setting the value of at least one variable for a filtering process, which at least one variable determines at least one of: the type and the extent of at least one of: a spatial and temporal filtering process as a function of the value of the statistical variable,
  d) operating the X-ray image recording device with an image object in the X-ray image recording device in order to obtain detector data corresponding to an X-ray image of the image object, and
  e) processing the detector data using at least one of a spatial and temporal filtering process determined by the at least one variable set in step c) in order to provide the two-dimensional image data,
  wherein the statistical variable defines a curve profile of a curve that reproduces an extent of averaging within the scope of the filtering process as a function of a local standard deviation or a standard deviation relating to a short period of time, such that the noise is averaged away by the filtering process.

2. The method according to claim 1, wherein the statistical variable is a standard deviation or a variance.

3. The method according to claim 1, wherein step a) is carried out repeatedly using different X-ray beam doses and a value for the statistical variable is derived in step b) for each X-ray beam dose and a value for a variable for the filtering process is set in step c), and in which the filtering process in step e) is carried out on the basis of a value that is associated with an X-ray beam dose utilized in step d).

4. The method according to claim 1, wherein the statistical variable is established in step b) for a plurality of spatial frequencies, the at least one variable for the filtering process is set in step c) for each spatial frequency and the filtering process in step e) is carried out separately for each of the plurality of spatial frequencies.

5. The method according to claim 1, the method being implemented using an X-ray image recording device, in which the X-ray beam detector is a flat-panel detector with a scintillator and a plurality of photodetector elements.

6. An X-ray image recording device for providing two-dimensional image data, comprising
  an X-ray beam source, and
  an X-ray beam detector, and
  a processor operable to process detector data provided by the X-ray beam detector, wherein the X-ray image recording device is controlled
    to operate without an image object in the X-ray image recording device in order to obtain detector data corresponding to an empty image,
    to evaluate the detector data corresponding to the empty image for obtaining the value of a statistical variable that contains information relating to the amount of noise,
    to set the value of at least one variable for a filtering process, which at least one variable determines at least one of: the type and the extent of at least one of: a spatial and temporal filtering process as a function of the value of the statistical variable,
    to operate with an image object in the X-ray image recording device in order to obtain detector data corresponding to an X-ray image of the image object, and
    to process the detector data corresponding to the image object using at least one of a spatial and temporal filtering process determined by the at least one variable set in order to provide the two-dimensional image data,
  wherein the statistical variable defines a curve profile of a curve that reproduces an extent of averaging within the scope of the filtering process as a function of a local standard deviation or a standard deviation relating to a short period of time, such that the noise is averaged away by the filtering process.

7. The X-ray image recording device according to claim 6, wherein the statistical variable is a standard deviation or a variance.

8. The X-ray image recording device according to claim 6, wherein operating the X-ray image recording device without an image object is carried out repeatedly using different X-ray beam doses and a value for the statistical variable is derived for each X-ray beam dose and a value for a variable for the filtering process is set, and in which the filtering process in is carried out on the basis of a value that is associated with an X-ray beam dose utilized when operating the X-ray image recording device with an image object.

9. The X-ray image recording device according to claim 6, wherein the statistical variable is established for a plurality of spatial frequencies, the at least one variable for the filtering process is set for each spatial frequency and the filtering process is carried out separately for each of the plurality of spatial frequencies.

10. A method for providing two-dimensional image data with the aid of an X-ray image recording device, comprising:
  a) receiving first image data by operating the X-ray image recording device without an image object in the X-ray image recording device,
  b) evaluating the first image data to determine a value of a statistical variable that contains information relating to the amount of noise,
  c) setting the value of at least one variable for a filtering process, which at least one variable determines at least one of: the type and the extent of at least one of: a spatial and temporal filtering process as a function of the value of the statistical variable,
  d) receiving second image data by operating the X-ray image recording device with an image object in the X-ray image recording device, and
  e) processing the second image data using at least one of a spatial and temporal filtering process determined by the at least one variable set in step c) in order to provide the two-dimensional image data,
  wherein the statistical variable defines a curve profile of a curve that reproduces an extent of averaging within the scope of the filtering process as a function of a local standard deviation or a standard deviation relating to a short period of time, such that the noise is averaged away by the filtering process.

11. The method according to claim 10, wherein the statistical variable is a standard deviation or a variance.

12. The method according to claim 10, wherein step a) is carried out repeatedly using different X-ray beam doses and a value for the statistical variable is derived in step b) for each X-ray beam dose and a value for a variable for the filtering process is set in step c), and in which the filtering process in step e) is carried out on the basis of a value that is associated with an X-ray beam dose utilized in step d).

13. The method according to claim 10, wherein the statistical variable is established in step b) for a plurality of spatial frequencies, the at least one variable for the filtering process is set in step c) for each spatial frequency and the filtering process in step e) is carried out separately for each of the plurality of spatial frequencies.

\* \* \* \* \*